Feb. 9, 1965 F. N. HUFFMAN 3,169,200

THERMOTUNNEL CONVERTER

Filed June 22, 1962 3 Sheets-Sheet 1

INVENTOR.
Fred N. Huffman

BY

Roland A. Anderson

ATTORNEY.

Feb. 9, 1965 F. N. HUFFMAN 3,169,200

THERMOTUNNEL CONVERTER

Filed June 22, 1962 3 Sheets-Sheet 2

INVENTOR.
Fred N. Huffman
BY
Roland A. Anderson
ATTORNEY.

INVENTOR.
Fred N. Huffman
BY
Roland A. Anderson
ATTORNEY.

3,169,200
THERMOTUNNEL CONVERTER

Fred N. Huffman, Baltimore, Md., assignor to the United States of America as represented by the United States Atomic Energy Commission
Filed June 22, 1962, Ser. No. 204,658
4 Claims. (Cl. 310—4)

This invention relates to means for converting thermal energy to electric power, and more especially to a novel class of devices differing from thermoelectric and thermionic converters. These novel devices will be denoted herein as "thermotunnel converters."

Despite a large scale research effort by both Government and industry, progress in development of thermoelectric semicondctor materials appears to be blocked by two presently insurmountable obstacles: (1) an upper temperature limit of almost 1000° K. for the hot junction, and (2) high thermal conduction of the lattice of the materials. Obstacle (2) is quite serious, because a good converter must have a high electron transfer characteristic with a low heat transfer rate. Obstacle (1) arises where extremely high temperatures will be encountered, as in many nuclear reactor and space propulsion applications, so that thermoelectric converters are essentially low-temperature devices.

In thermionic diode devices, a hot emitter is spaced about .001 to 1 cm. away from a cooler collector, thus breaking the lattice to heat transfer by conduction. Radiation is then the primary mechanism for heat transfer. But thermionic converters are inherently high temperature devices because the electrode materials have relatively high work functions, so that high current densities cannot be obtained at low temperatures.

Thus there is a range of temperatures—between about 700° and 1400° K.—in which substantial improvement in performance is desired.

Accordingly, it is a principal object of this invention to provide a power converter in which the thermal conduction of the lattice is reduced, while the electron transfer rate is maintained high. Another object is to provide a converter suitable for use at temperatures above 1000° K. as well as at intermediate temperatures (700°–1000° K.). Yet another object is to provide a new class of power converters that are free from the inherent limitations of both thermionic and thermoelectric devices, and which give greatly improved operation between 700° and 1300° K.

In accordance with this invention, two electrodes are spaced apart by a closely-controlled distance up to the order of $4\times10^{-7}$ cm. (40 angstroms). A thermal gradient is established across the device. The hotter electrode becomes the emitter while the other is cooled and becomes the collector. Some means is provided to thermally insulate the two electrodes from each other. Because the electrons in the hotter electrode will have a higher average energy distribution than those in the collector, more electrons from the hotter electrode will tunnel through the potential barrier between the plates to the collector than will tunnel in the reverse direction. Thus the heat applied to the emitter raises electrons to higher energy levels where the probability is increased for their tunneling through the barrier to the collector. The electrons received at the collector may be run through a load impedance to deliver useful work.

The invention may be best understood from the following detailed description of prefererd embodiments thereof, when read in connection with the attached drawings, wherein.

Figure 1:
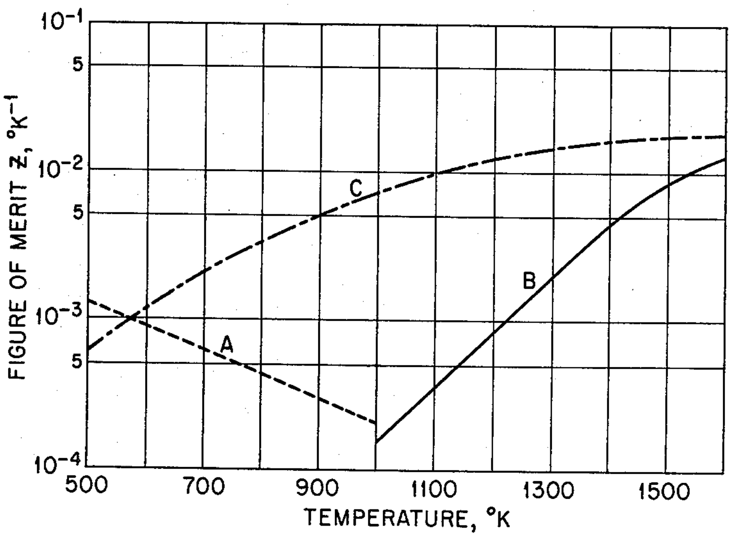
FIG. 1 shows a comparison of the figures of merit for thermoelectric, thermonic, and thermotunnel converters.

Referring now to FIG. 1, three curves are shown: Curve A shows the figure of merit $Z_{TE}$ as a function of temperature for typical "N" type lead-tellurium thermoelectric converters; curve B shows a typical curve for a thermionic converter of impregnated tungsten; and curve C shows a curve for a thermotunnel converter with 5 A. spacing between electrodes. The ordinate, being respective figures of merit, indicate a measure of the efficiency of conversion possible with the device, and are described more fully by Kaye and Welsh in Direct Conversion of Heat to Electricity. It is obvious from a glance that from about 700° K. to about 1300° K., the two known devices have very low efficiencies, whereas the thermotunnel converter successfully bridges the gap between low and high temperature devices and has a very high figure of merit in the desired region.

Figures 2, 3, 4:
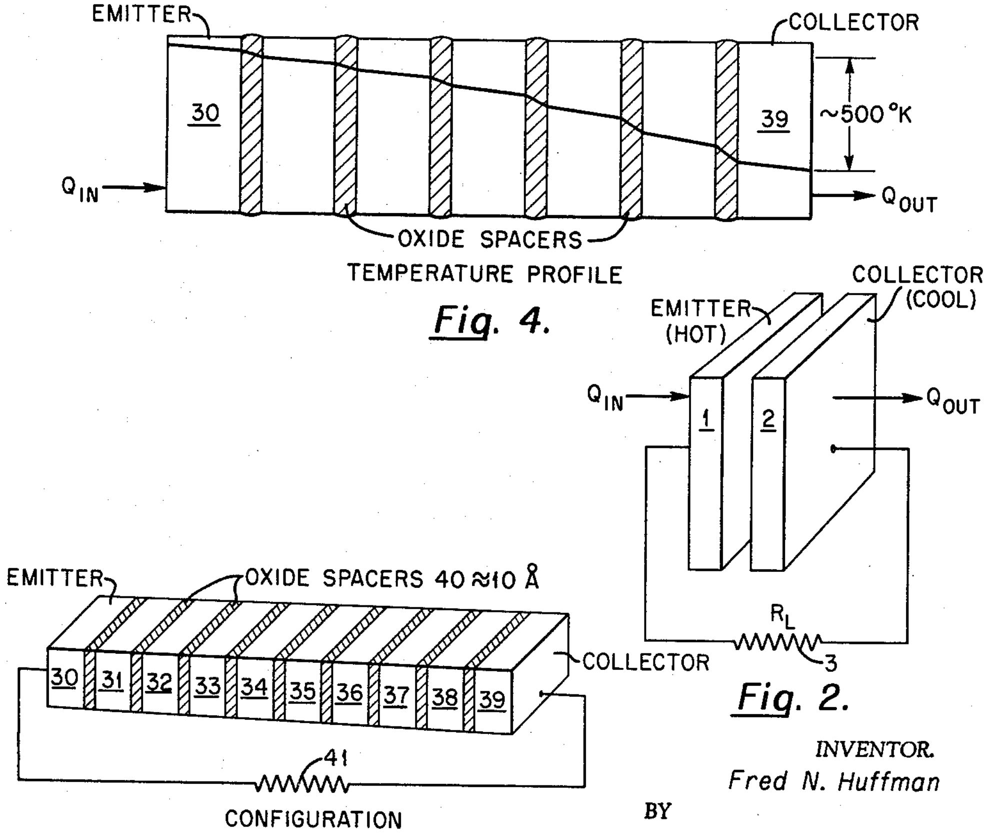
FIG. 2 shows schematically the basic principle of the invention.
FIG. 3 illustrates one form of device for practicing the invention.
FIG. 4 shows a temperature profile across the device of FIG. 3.

Referring to FIG. 2, in a simple form of a thermotunnel converter, emitter electrode 1 is heated while collector electrode 2 is maintained at a temperature below that of electrode 1, for example, by placing a heat source such as a nuclear reactor fuel element adjacent emitter 1. Electrons from emitter 1 have a greater probability of tunneling across the potential barrier to collector 2 than the probability for electrons to tunnel across in the other direction. As a result more electrons flow to collector 2 across the gap than leave it, producing a current which can be passed through a load impedance 3, doing useful work. $Q_{IN\text{-}OUT}$ indicates the direction of the heat flux. The electrodes are preferably of as low a work-function as possible, to best utilize the applied heat.

By "tunneling" is meant the observed phenomenon that electron waves are transmitted through a potential barrier which is of the same thickness or less than the electron wavelength. It may also be considered on the basis of the uncertainty principle. If the width of a barrier is of the same order as the uncertainty in position of an electron, then there is a very good probability of finding an electron on either side of the barrier. Accordingly, the spacing between electrodes in thermotunnel converters is equal to or less than the electron wavelength in the spacing material. In a conventionally attainable vacuum (of $10^{-5}$ mm. Hg, for example) the spacing is of the order of 40 angstroms.

Thin oxide films may be grown thermally or produced by anodizing as described by Haas in "Journal of the Optical Society of America," vol. 39, page 532, for example, which are of the required thickness. Several layers of anodized films may be piled on one another with small contact coefficients between the layers. The effective thickness of such oxide films as a potential barrier is less than the actual measured thickness by a factor of about three relative to vacuum, because of the ion cores in the oxide, so that tunneling occurs through films of up to the order of 120 A. thickness, and such films may be used in thermotunnel converters. The films should have as small contact coefficients with the emitter and collector electrodes as possible, to reduce the thermal conduction across the spacer.

Thin oxide film spacers may also be used, however, which have perfect thermal bonds to the emitter and collector electrodes. In such case the converters are fabricated in a plurality of layers. The figure of merit of such devices can be made larger than that for corresponding thermoelectric power generating couples provided the electrical resistivity of the spacer in the converter is much smaller than that of the thermo electric material. The tunnel effect achieved with very small spacings (below about 20 A.) makes the spacer resistivity much lower, as is evident for the example of $Cu_2O$. Its experimentally observed resistivity is 68 ohm-cm., so that for a spacer $3\times10^{-8}$ cm. (3 A.) this total resistivity is about $2\times10^{-6}$ ohm-cm.$^2$ in a thermo-tunnel converter. The observed total resistivity in $Cu_2O$ is $10^{-8}$ ohm-cm.$^2$, however, showing that the tunneling effect reduces the resistivity—for samples of thickness of the order herein described—by a factor of 50. A large number of emitter-spacer-collector sandwiches—preferably about $10^6$—placed in series will develop suitably large currents to be useful with reasonable heat fluxes.

Referring now to FIG. 3, a multilayer converter comprises an emitter 30, a collector 39, intermediate elements 31–38, and oxide spacers 40 disposed between each adjacent element. Apposite faces on each of the elements 30–39 serve as emitter and collector, respectively, because of the thermal gradient maintained across the device. A load 41 is connected to the two electrodes 30, 39.

FIG. 4 shows a temperature profile across the device of FIG. 3 for a temperature difference of about 500° K., for example. Electrons tunnel through each oxide barrier to a cooler collector, having as a result higher potential. Each collector is at a higher potential that the adjacent emitter which it confronts, and at the same potential as the emitter which forms a part of the same piece of material. By traversing some $10^6$ layers, the total Fermi level shift across the device for reasonable heat fluxes is sufficient to provide good efficiency.

The equation giving the thermotunnel power for any material may be derived, and values for specific materials substituted to obtain numerical values for those materials. This thermotunnel power is analogous to the thermoelectric or thermoionic power. Omitting the derivation for simplicity, the thermotunnel power $\beta$ of the thermotunnel leg only of a couple (not including the return lead) may be found from the relation:

$$\beta \simeq \frac{\dfrac{k}{\left(\dfrac{A}{\delta\sqrt{B}}-\dfrac{1}{kT}\right)}}{\dfrac{\delta\sqrt{B}}{A}-\dfrac{1}{\left(\dfrac{A}{\delta\sqrt{B}}-\dfrac{1}{kT}\right)}}$$

where:

$\beta$ is the thermotunnel power
$k$ is $8.62\times10^{-5}$ e.v./° K.

$$A=\frac{4\pi S\sqrt{2m}}{h}$$

$$B=E_f+\phi+\frac{eV}{2}$$

$T$=temperature, degrees K.

$$\delta=\frac{E_F}{B-\sqrt{B^2-BE_F}}$$

$s$ is the potential barrier thickness, Angstroms
$E_F$ is the Fermi level, e.v.
$\phi$ is the work function, e.v.
$eV$ is the Fermi level shift, e.v.
$m$ is the electronic mass, grams
$h$ is Planck's constant.

For example, substituting the known constants for aluminum in the above equation:

$$\beta=\frac{\dfrac{8.62\times10^{-5}}{\left[\dfrac{11.6\times10^3}{T}-(.217)s\right]}}{\dfrac{4.6}{s}+\dfrac{1}{\left[\dfrac{11.6\times10^3}{T}-(.217)s\right]}}$$

Figure 5:
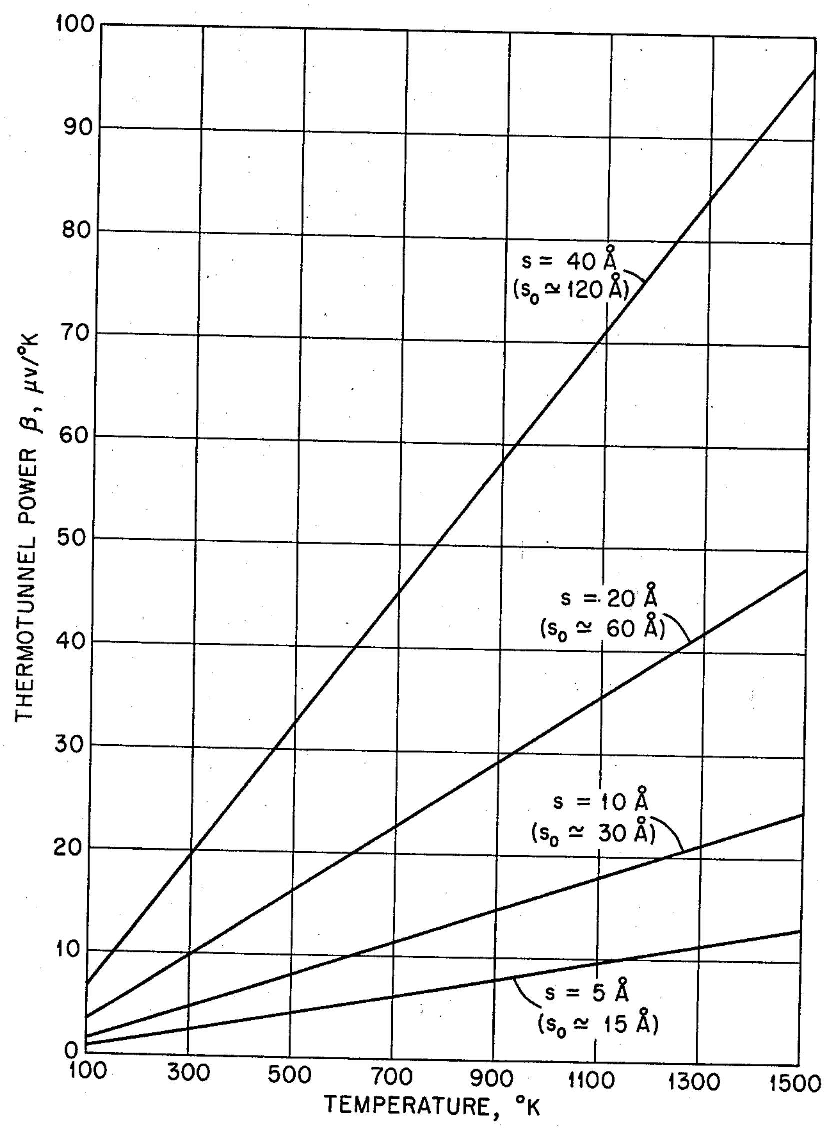
FIG. 5 shows the thermotunnel power as a function of temperature.

FIGURE 5 illustrates numerical values for $\beta$ plotted against temperatures from 100°–1500° K., for four different values of vacuum spacer $s$. The equivalent thicknesses using oxide spacers are also given on the curves and are substantially three times as great.

The figure of merit for thermotunnel devices of the type shown in FIG. 3, analogous to Joffe's figure of merit, may be defined:

$$Z=\frac{\beta^2}{P_T K}$$

Z is the figure of merit
$\beta$ is the thermotunnel power
K is the thermal conductivity, watt/cm.-° K.
$P_T$ is the tunnel resistivity of the spacer.

The tunnel resistivity is found from the equation:

$$P_T=3.18\times10^{-11}\left(\frac{1}{\sqrt{\phi}}\right)e^{1.025s\sqrt{\phi}}$$

where $\phi$ is the work function, e.v.

Figure 6:
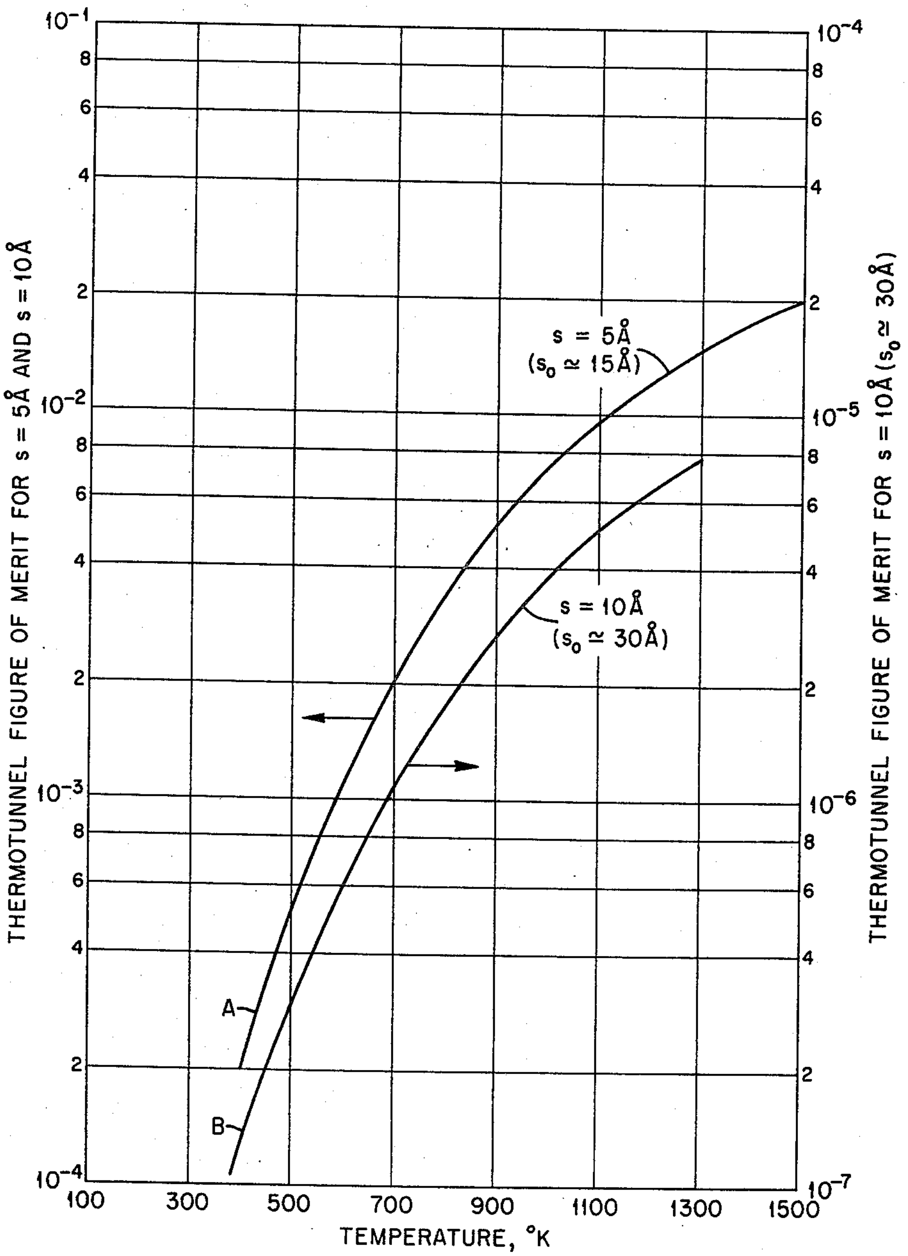
FIG. 6 shows the figure of merit for different spacer thicknesses.

Referring now to FIG. 6, the figure of merit Z is plotted against temperature for two different spacer thicknesses. It may be seen that for ranges of practical interest (under 1500° K.) the spacer thickness should be no greater than 5 A. (15 A. for oxide spacers) so as to operate at the maximum figure of merit.

The values given for the figure of merit are conservative. They may be too low by an order of magnitude, since (1) the actual thermotunnel power achieved may be greater by a factor of three than that given by the approximate equation for $\beta$ given above, as is shown by other calculations which will not be given here; and (2) the oxide ion cores will effect the electrical conductivity. Hence operation appears feasible with oxide spacers of thickness of the order of 20 A., but no greater, since at greater thicknesses the figure of merit would fall below curve B of FIG. 6.

To return to the device of FIG. 3, assuming aluminum electrodes, aluminum oxide spacers, a temperature drop across the device of 500° K., a spacing of 20 A. of oxide, an average thermal conductivity per converter of 0.2 watt/cm.=° K., and a typical heat flux of 200 thermal watts/cm.$^2$, the required number of converters joined together may be found:

$$Q=\frac{K\Delta T}{s}$$

where:

Q is the heat flux, watt/cm.$^2$
K is the thermal conductivity, watt/cm.=° K.
$s$ is the spacer thickness, cm.
$\Delta T$ is the temperature drop, ° K., across one converter.

Substituting in the above equation, $\Delta T=10^{-4}$° K. For a total of 500° K., obviously $5\times10^6$ converters must be joined together.

Since the temperature drop across the metal electrodes is small compared to that across the oxide spacer (for aluminum the ratio is about 1:40), with an oxide spacer of 10 A. and electrodes of 40 A., about 90% of the temperature drop will occur across the oxide as desired. The total length of the converter is about 2.5 cm.

*Example*

In a preferred embodiment, aluminum electrodes of 40 A. thickness are separated with anodized aluminum oxide films prepared by the method of Haas above, the films being 10 A. thick. Some $5 \times 10^6$ "sandwiches" of oxide between electrodes are joined together. Respective leads are connected to the two external (first and last) aluminum electrodes, and those two leads are connected to supply an external load.

What is claimed as novel is:

1. Apparatus for converting thermal energy into electrical energy comprising:
   (1) at least one electron emissive surface;
   (2) a second surface disposed closely adjacent thereto to define a gap of width less than 40 angstrom units between said surfaces;
   (3) means for creating a temperature gradient between said surfaces, with said emissive surface the hotter to produce a flow of electrons to said second surface across said gap by means of the quantum mechanical tunnel effect; and
   (4) means to thermally insulate said surfaces from each other across said gap.

2. The device of claim 1 wherein the pressure within said gap is below $10^{-5}$ mm. of mercury.

3. A thermotunnel converter comprising:
   (1) at least a first electron emissive surface;
   (2) a second surface disposed closely adjacent thereto to define a gap between said surfaces;
   (3) means for creating a thermal gradient across said converter from said first to said second surface to produce a flow of electrons across said gap; and
   (4) oxide film spacer means disposed between said surfaces and contacting said surfaces, the contact between a surface and said spacer being characterized by a small contact coefficient to provide minimum thermal conduction, said spacer means being less than about 120 angstrom units in thickness.

4. A thermotunnel converter comprising:
   (1) a plurality of aligned metal electrodes arranged in spaced relationship;
   (2) respective oxide film spacers disposed between said electrodes, said spacers being bonded to said electrodes to provide a maximum thermal conductivity between said electrodes and said spacers, the thickness of said spacers being less than about 20 angstrom units;
   (3) means to create a temperature gradient across said converter from the first to the last electrode;
   (4) means to connect said first and last electrodes to an external load to supply power thereto.

References Cited by the Examiner

UNITED STATES PATENTS 3,053,923 9/62 Stearns ---------------- 136—4

MILTON O. HIRSHFIELD, *Primary Examiner.*